United States Patent
Hess

(10) Patent No.: US 9,030,465 B2
(45) Date of Patent: May 12, 2015

(54) VEHICLE USER INTERFACE UNIT FOR A VEHICLE ELECTRONIC DEVICE

(75) Inventor: Wolfgang Hess, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 228 days.

(21) Appl. No.: 13/076,243

(22) Filed: Mar. 30, 2011

(65) Prior Publication Data

US 2011/0242102 A1    Oct. 6, 2011

(30) Foreign Application Priority Data

Mar. 30, 2010    (EP) .................................... 10003477

(51) Int. Cl.
   *G06T 15/00*    (2011.01)
   *G06F 3/01*    (2006.01)
   *B60K 35/00*    (2006.01)
   (Continued)

(52) U.S. Cl.
   CPC ................ *G06F 3/011* (2013.01); *B60K 35/00* (2013.01); *B60K 37/06* (2013.01); *B60K 2350/2017* (2013.01); *G01S 5/163* (2013.01); *G06F 3/017* (2013.01); *G06F 3/0481* (2013.01); *G06F 3/04815* (2013.01); *G06F 3/0482* (2013.01); *G06F 2203/04802* (2013.01); *H04N 13/0468* (2013.01); *H04N 13/0497* (2013.01)

(58) Field of Classification Search
   CPC ... G06F 3/011; G06F 3/04815; G06F 3/0482; G06F 3/017; G06F 3/0481; G06F 2203/04802; B60K 35/00; B60K 37/06; B60K 2350/2017; G01S 5/163; H04N 13/0468; H04N 13/0497
   See application file for complete search history.

(56) References Cited

U.S. PATENT DOCUMENTS 5,678,015 A    10/1997    Goh
5,995,104 A    11/1999    Kataoka et al.
(Continued)

FOREIGN PATENT DOCUMENTS

DE    10 2006 032 117 A1    1/2008
JP    H09134269 A    5/1997
(Continued)

OTHER PUBLICATIONS

Chen et al, Video-based Eye Tracking for Autostereoscopic Displays, 2001, Opt. Eng. 40(12) 2726-2734.*

(Continued)

*Primary Examiner* — Kee M Tung
*Assistant Examiner* — Nicholas R Wilson
(74) *Attorney, Agent, or Firm* — Alleman Hall McCoy Russell & Tuttle LLP

(57) ABSTRACT

A vehicle user interface unit for a vehicle electronic device. The vehicle user interface unit includes a three-dimensional ("3D") display unit having a display, and is configured to display an image for perception by a user as a virtual 3D image. The virtual 3D image is at least partially located in front of the display when the user observes the display. A display control unit is configured to control the generation of the image by the 3D display unit. The virtual 3D image includes a 3D object having at least two regions located in different spatial planes. Each region includes a plurality of interaction elements. An input unit is configured to detect the location of a user-controlled object and to interpret the detection of a predefined variation of the user-controlled object as a selection of one of the interaction elements in the virtual 3D image.

23 Claims, 5 Drawing Sheets

(51) Int. Cl.
  *B60K 37/06* (2006.01)
  *G01S 5/16* (2006.01)
  *G06F 3/0481* (2013.01)
  *G06F 3/0482* (2013.01)
  *H04N 13/04* (2006.01)

(56) References Cited

U.S. PATENT DOCUMENTS

| | | | |
|---|---|---|---|
| 6,243,054 B1 | 6/2001 | DeLuca | |
| 6,456,737 B1 * | 9/2002 | Woodfill et al. | 382/154 |
| 6,559,813 B1 | 5/2003 | DeLuca et al. | |
| 2004/0254699 A1 | 12/2004 | Inomae et al. | |
| 2007/0132721 A1 * | 6/2007 | Glomski et al. | 345/156 |
| 2008/0161997 A1 * | 7/2008 | Wengelnik et al. | 701/36 |
| 2009/0231278 A1 * | 9/2009 | St. Hilaire et al. | 345/158 |
| 2010/0050129 A1 | 2/2010 | Li et al. | |
| 2010/0128112 A1 * | 5/2010 | Marti et al. | 348/51 |

FOREIGN PATENT DOCUMENTS

| | | | |
|---|---|---|---|
| JP | 2000075991 A | * | 3/2000 |
| JP | 2008538037 A | | 10/2008 |

OTHER PUBLICATIONS

Japanese Patent Office, Office Action Issued in Japanese Patent Application No. 2011-035242, Jan. 22, 2015, 10 pages.

* cited by examiner

VEHICLE USER INTERFACE UNIT FOR A VEHICLE ELECTRONIC DEVICE

RELATED APPLICATIONS

This application claims priority of European Patent Application Serial Number 10 003 477.6, filed on Mar. 30, 2010, titled VEHICLE USER INTERFACE UNIT FOR A VEHICLE ELECTRONIC DEVICE, which application is incorporated in its entirety by reference in this application.

BACKGROUND

1. Field of the Invention

The invention relates to a vehicle user interface unit, and more particularly, to a vehicle interface unit for a vehicle electronic device and a vehicle infotainment system, and methods for operating the vehicle interface unit.

2. Related Art

Vehicles are typically equipped with a user interface to allow the user (driver or passenger) to control functions relating to the vehicle itself or to an electronic device provided in the vehicle, such as an infotainment system. The user may be provided with control over functions and information or with a display of information that may relate to driver assistance systems, a multimedia system such as a car radio or mobile communication systems that communicate for example, via GSM or UMTS. Information from outside the vehicle may also be made available to the driver or passenger. For example, information may be received from communications systems that permit information retrieval and transmission from the car to the world, including for example, communication from car to car, or from car to infrastructure.

The user typically interacts with a head unit having a user interface with a display and control elements that allow the user to control the desired functions. The head unit typically has a face plate on the dashboard of the vehicle. Vehicles have limited space on the dashboard and the face plate, therefore, the mechanical control elements and the display may have to share the limited amount of space available in the dashboard with each other and with other components. The space limitation may limit the amount of information that may be simultaneously displayed to the user. In addition, only a few control elements may be available to operate and control a larger number of functions that may be offered to the user.

User access to the larger number of functions via a few control elements is generally achieved using a menu tree structure with main menus and multiple submenus, through which a user browses to reach a particular function. Menu structures may be cumbersome for the user. Browsing through the menus and submenus may take a considerable amount of time before the user reaches a particular menu item. During this time, if the user is also driving, the effort to find the desired menu item may distract the user sufficiently to create a dangerous situation.

One solution uses speech recognition for voice-activated commands to access the functions. However, such solutions have not yielded any considerable improvement due to the numerous enquiries by the system and the browsing through the menu structure still required by voice-activated commands.

Some improvement may be achieved using a touch screen, which replaces many of the mechanical control elements with graphical control elements. By removing the mechanical control elements, space becomes available on the face plate for a larger size display without needing a larger face plate. Nevertheless, the available physical space typically remains rather limited permitting a limited amount of information or menu items to be displayed resulting in a generally confusing presentation, particularly when accessing complex menu structures. The control elements are also graphically relatively small and fail to provide any haptic feedback. User interfaces having a touchscreen are not considerably easier to operate inside a vehicle, particularly when attempted by the driver. Touchscreens are also susceptible to becoming soiled, such as by fingerprints, deteriorating the quality of the displayed image.

There is a need for an improved presentation of menu structures and other information, and for facilitating the selection of menu items for controlling the functions of a vehicle electronic device, the vehicle itself or for adjusting parameters.

SUMMARY

A vehicle user interface unit for a vehicle electronic device. The vehicle user interface unit includes a three-dimensional ("3D") display unit having a display, and is configured to display an image for perception by a user as a virtual 3D image. The virtual 3D image is at least partially located in front of the display when the user observes the display. A display control unit is configured to control the generation of the image by the 3D display unit. The virtual 3D image includes a 3D object having at least two regions located in different spatial planes. Each region includes a plurality of interaction elements. An input unit is configured to detect the location of a user-controlled object and to interpret the detection of a predefined variation of the user-controlled object as a selection of one of the interaction elements in the virtual 3D image.

It is to be understood that the features mentioned above and those yet to be explained below can be used not only in the respective combinations indicated, but also in other combinations or in isolation, without leaving the scope of the present invention.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The description below may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
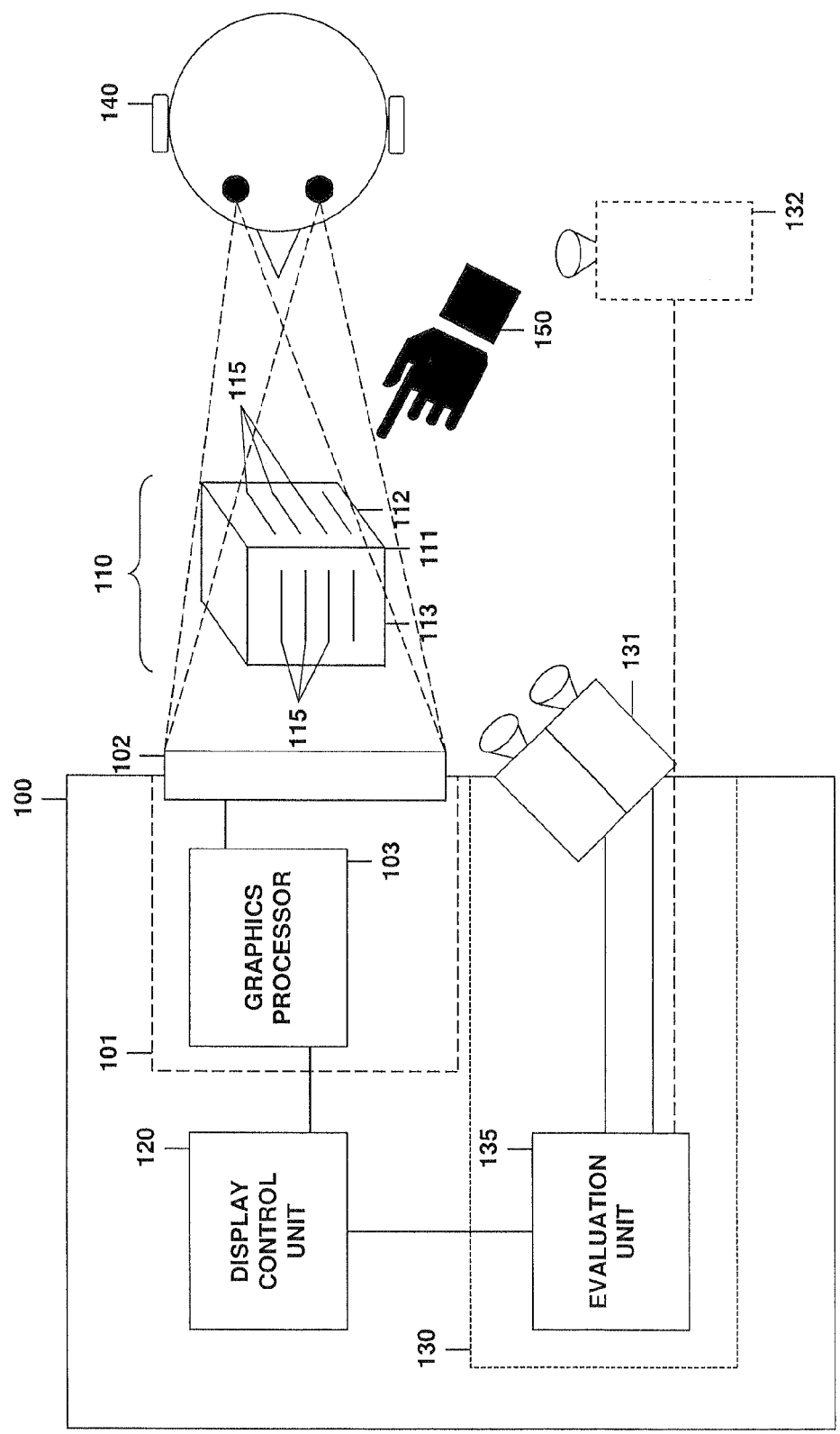
FIG. 1 is a schematic diagram of an example of a vehicle user interface unit.

FIG. 1 is a schematic diagram of an example of a vehicle user interface unit 100. The vehicle user interface unit 100 may be part of a head unit, a vehicle infotainment system, or any other vehicle electronic device. The vehicle user interface unit 100 includes a display control unit 120 to control operation of the vehicle user interface unit 100, a 3D display unit 101, and an input unit 130. The 3D display unit 101 and input unit 130 are both in electronic communication with the display control unit 120. As such, the 3D display unit 101 and the input unit 130 communicate information to the display control unit 120.

In the example illustrated in FIG. 1, the 3D display unit 101 includes a display 102 connected to a graphics processor 103. The graphics processor 103 receives image data that includes data for a 3D image to be displayed using the display control unit 120. The graphics processor 103 generates a corresponding output signal for the display 102. The 3D display unit 101 in FIG. 1 may be an autostereoscopic display unit, which is a display that it is capable of generating an image by for perception by a user 140 as a virtual 3D image 110. The virtual 3D image 110 is a 3D image generated for perception by the user without the having to wear spectacles. The display 102 generates the virtual 3D image 110 by projecting each view required to generate depth perception into one eye of the observing user 140 as shown schematically by dashed lines in FIG. 1.

An autostereoscopic display may be realized using techniques known to those of ordinary skill in the art, and are therefore not described in greater detail here. One example of such a technique includes continuously monitoring the position of the user's head. An image of the user's head may be captured using a stereoscopic camera 131 or by a non-stereoscopic camera 132. The adjustment of the projection optics and view content may be monitored accordingly using the capture image. The content of each view may be matched to the position of the eye, which may be identified using a face tracking technique. The display 102 may include a liquid crystal display with a continuously scanning spot source of light in the focal plane of a lens. The liquid crystal display may be used to control the intensity of light emitted by the display 102 as a function of ray direction. The lens and light source produce rays all travelling in one general direction at any one instant. The direction of the rays may be synchronized with the display of appropriate views of the 3D image on the liquid crystal display. In examples of this technique, the frame rate of the display 102 may be doubled to allow the eyes of the observing user 140 to integrate a 3D image over time. The faces of other users, such as for example, passengers inside the vehicle, may be tracked and the frame rate of the display 102 may be increased accordingly to enable the perception of the virtual 3D image by the other users.

Other techniques that may be employed using the 3D display unit 101 include multiple view autostereoscopy in which the display 102 projects views to every position where a viewer might be. Examples of implementations may include a lenslet array, which covers a pixel for each view. The lenslets combine to make the pixels for each view visible exclusively in one direction. Diffraction gratings or an array of slits may also be used instead of an array of lenslets. Using a diffraction grating makes it possible to extend the field of view. The lenslet array and diffraction grating techniques may be implemented using an underlying display with a resolution that is the product of the view resolution and the number of views, which may require a high resolution display. In an example implementation, the high resolution display may be replaced by a technique that involves generating several video projections lined up behind a lens. The lens may then make each view corresponding to a projection visible in a different direction.

As described above with reference to FIG. 1, the 3D display unit 101 may generate the virtual 3D image 110 perceived by the user 140 using a variety of techniques. It is to be understood that other implementations may include examples in which the 3D display unit 101 operates in conjunction with shutter glasses to be worn by the user 140. Different views are alternately projected to the eyes of the user 140 enabling the use of a conventional display 102 with doubled frame rate. In another technique, each view is displayed using light of a different polarization allowing a user wearing corresponding polarizing spectacles to receive the intended view.

The display control unit 120 may provide general information relating to a 3D object 111 to be included in the virtual 3D image 110 to a graphics processor 103. The graphics processor 103 may then calculate the different views to be displayed to the user 140 to generate the binocular perception of depth (stereopsis). When these different views are displayed to the user 140 by the display 102, the user 140 perceives the virtual 3D image 110. In the example illustrated in FIG. 1, the 3D display unit 101 is configured to form the virtual 3D image 110 in front of the display 102. For example, the virtual 3D image 110 may be positioned between the display 102 and the observing user 140. In other example implementations, the virtual 3D image 110 may be partially located in front of the display 102.

It is noted that the display 102 may also be used to display two-dimensional (2D) images, and that the 3D display unit 101 may be the display unit of a vehicle electronic device, such as an infotainment system. Thus, menu structures, maps for navigation, multimedia information or media streams may be displayed on the display 102.

The display control unit 120 may be implemented using a microprocessor, which may be the microprocessor used for control by the vehicle electronic device or of any other system in which the vehicle user interface unit 100 is implemented, and may as such perform other functions unrelated to the user interface. Other implementations of the display control unit 120 may use multiple microprocessors, a special purpose microprocessor, a digital signal processor (DSP), an application-specific integrated circuit (ASIC) or a field-programmable gate array. The microprocessor may operate according to programs stored in a storage device (not shown) having an interface to the microprocessor.

In other example implementations, the graphics processor 103 may not be used, and functions attributed to the graphics processor 103 may be performed by the display control unit 120. The 3D display unit 101 may also include software code portions running on a microprocessor operating in the display control unit 120. It is also possible that the graphics processor 103 and the microprocessor are provided within a single chip, or component.

The vehicle user interface unit 100 in FIG. 1 also includes the input unit 130, which includes the stereoscopic camera 131 connected to an evaluation unit 135. The stereoscopic camera 131 monitors an area in which the virtual 3D image 110 is to be formed. In general, the stereoscopic camera 131 includes functions for monitoring the space in front of the display 102. The stereoscopic camera 131 includes two optical systems for acquiring two different views of the observed region. The example shown in FIG. 1 illustrates the two optical systems as being adjacent to one another. In other example implementations, the two optical systems may be arranged separately in other embodiments. For example, an optical system may be arranged on each side of the display 102.

Each optical system of the stereoscopic camera 131 includes a charge coupled device ("CCD") array for acquiring an image of a view of the region to be monitored. The acquired image data is received by the evaluation unit 135, which constructs a 3D representation of the observed region from the two different views provided by the stereoscopic camera 131. The position of a user-controlled object, such as the hand 150 of the user 140 may then be determined in three dimensions. The evaluation unit 135 may also include functions for identifying the object within the monitored region or area, and for tracking the detected object.

The evaluation unit 135 may also detect and interpret a predefined variation of the user-controlled object in the images received from stereoscopic camera 131. In the example illustrated in FIG. 1, the user-controlled object is the index finger of the user's hand 150. The position of the finger 150, a change in the position of the finger 150, and a variation in the shape of the index finger 150 may be determined by the evaluation unit 135 from the supplied images. The evaluation unit 135 interprets a predefined variation that it detects as a command. The predefined variations of the user-controlled object may include, for example, the movement of the user-controlled object to a particular location, such as when the tip of the index finger of the user's hand 150 is moved into the proximity of an element of the virtual 3D image 110, or when the index finger of hand 150 performs a gesture. The gesture may be identified by detecting a change in the shape of the user-controlled object.

The examples described above are only a few examples of how the user-controlled object may be implemented and how variations in the user-controlled object may be interpreted as commands. In example implementations, objects such as, a pen, a ring, or another marker positioned for control by the user may be monitored. Changes in the position of the objects or the performance of a gesture using the objects may be detected as commands. The illustrated example using a user's finger precludes the need for the user to hold or wear additional objects.

During operation of a vehicle electronic device using the vehicle user interface unit 100, the 3D object 111 projects the virtual image 110 using the display control unit 120 and the 3D display unit 101. The 3D object 111 includes a first region 112 with a plurality of interaction elements 115 and a second region 113 with a plurality of interaction elements 115. The first region 112 and second region 113 are positioned in two different spatial planes of the virtual 3D image 110. The positions of the different spatial planes in which the regions of the 3D object 111 are located may vary with the angle at which the display is observed by the user, which makes them "virtual spatial planes." In the example of FIG. 1, the 3D object 111 that may be perceived by the user 140 is a cube or cuboid in which the regions 112 and 113 each correspond to a face of the cube. The interaction elements 115 may be menu items of a main menu or a submenu, or information elements containing information for display to the user 140. The position and shape of the 3D object 111 and the interaction elements 115 displayed on the faces of the object may be controlled by the display control unit 120. The display control unit 120 may generate a virtual image of different types of 3D objects, such as other types of polyhedrons; for example, an octagonal prism or other similar shapes. The 3D object 111 is formed with several faces, each face displaying a different menu or submenu, or a certain class of information and control elements. The amount of information that can be simultaneously displayed may be multiplied or substantially increased using the three-dimensional representation.

The display control unit 120 may also project the object 111 in the virtual 3D image 110 with partially transparent faces. The partially transparent faces make the faces oriented on the backside of the object 111 visible by the user 140. The faces on the backside of the object 111 may include particular pieces of information or control elements that would otherwise be accessible to the user in different menus requiring the user to leave one menu to open another to locate the particular information or control element. The at least partially transparent faces provide the user with quick access to the particular information or control element. The vehicle user interface unit 100 may include a control element, such as for example, a button or an interaction element, for activating or deactivating the transparency, or for setting a transparency value. For example, the user may set a transparency value within a range of 0% to about 50%, or about 10% to about 20%, where 0% corresponds to an opaque region or face (regions covered by the opaque region are not visible) and 100% corresponding to a completely transparent (or invisible) region or face.

Figure 2A:
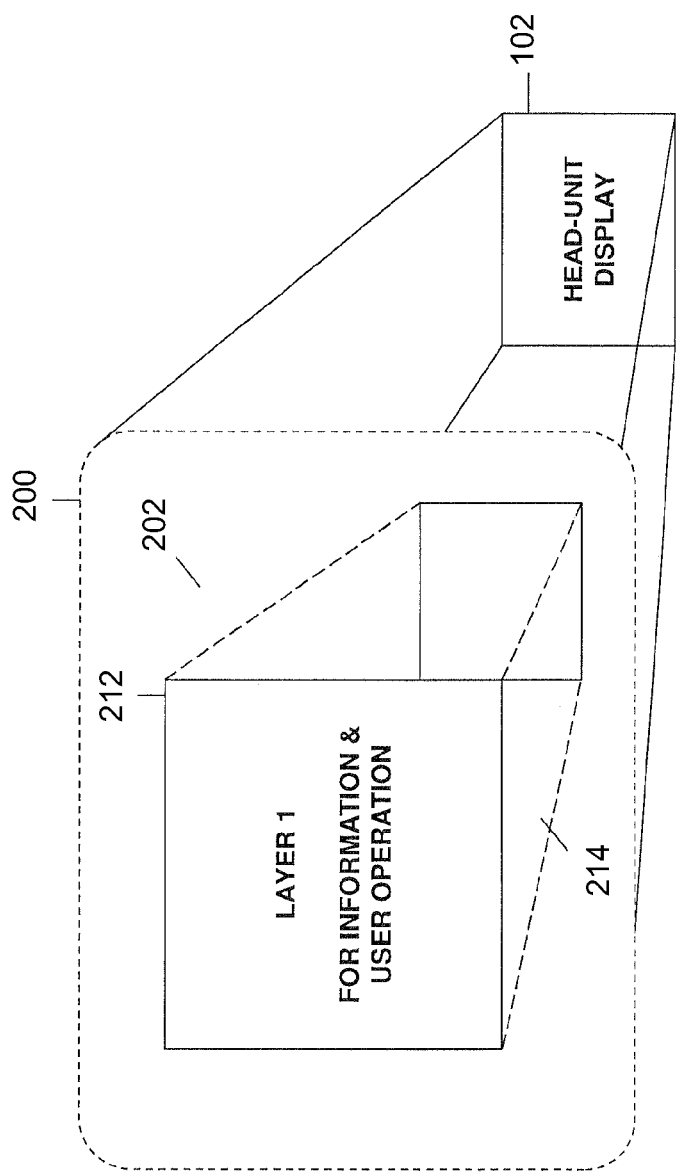
FIGS. 2A to 2C illustrate the generation of a virtual 3D image having a 3D object using a 3D display unit.
Figure 2B:
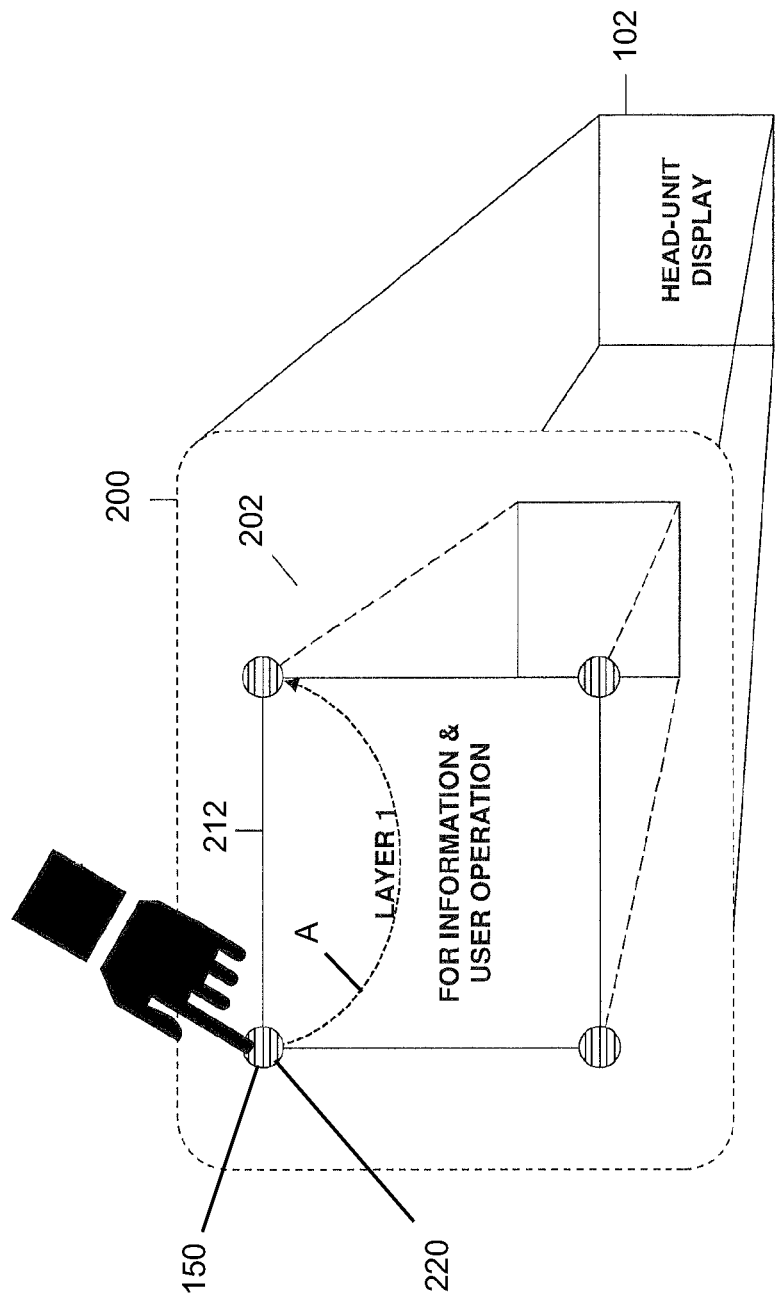
Figure 2C:
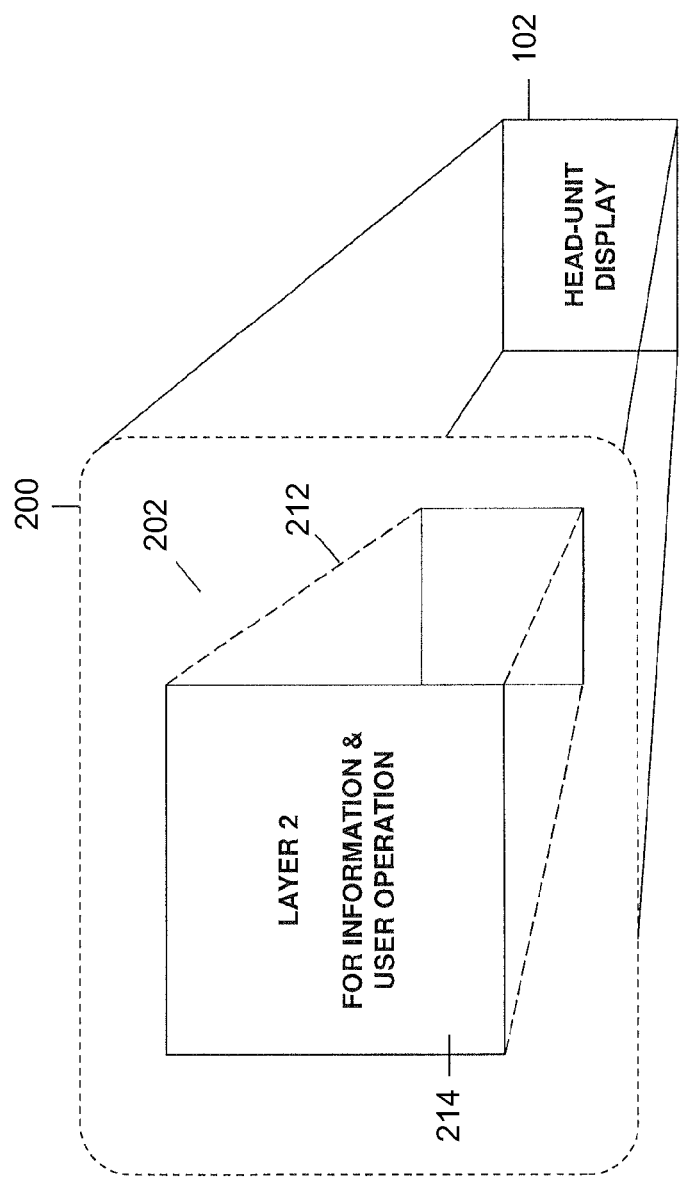

FIGS. 2A to 2C illustrate the generation of a virtual 3D image 200 having a 3D object 202, which is a cube 202 in FIG. 2A, using a 3D display unit 102 (as shown in FIG. 1) and obtaining access to functions by rotating the 3D object 202. FIG. 2A shows the cube 202 having a first region 212 on one face of the cube 202 and a second region 214 on another face of the cube 202. The cube 202 is oriented showing the first region 212 from the viewpoint of the user as the user observes the display 102 so that the face containing the first region 212 faces the user. The second region 214 is visible as a side face of the cube 202 due to the partial transparency of the face having the first region 212. An interaction element located on the second region 214 may be accessed by rotating the cube 202 so that the face having the second region 214 faces the user. After the rotation, the face having the second region 214 is displayed as facing the user from the viewpoint of the user, as illustrated in FIG. 2C.

As described above with reference to FIG. 1, the display control unit 120 generates the virtual 3D image 200 shown in FIG. 2A. The display control unit 120 includes data such as the position information of the virtual image 200. The display control unit 120 therefore includes data indicating the location in space of the 3D object 202. The position and space information is provided to the evaluation unit 135 (in FIG. 1) to enable the detection of a user input. The evaluation unit 135 receives the position information of the 3D object 202 as observed by the user 140 (in FIG. 1) and the position of the user's hand 150 (in FIG. 1). The evaluation unit 135 may then use the information to determine when the user-controlled object approaches or virtually touches an element of the virtual image 200. The input unit 130 (in FIG. 1) recognizes touches or virtual touches to elements on the 3D object 202 and certain gestures as user commands. In an example implementation, a virtual touch to one of the interaction elements 115 (shown in FIG. 1) on the first region 212 of the 3D object 202 is recognized as a command to select and execute the function associated with the virtually touched interaction element. The virtual touch is detected when the tip of the index finger of the user's hand 150 comes to within a predetermined distance from the respective interaction element in the virtual image 200. Other example implementations may pre-select the interaction element by a first virtual touch and execute the associated function by a second virtual touch. Example implementations may also execute the function after a virtual touch that lasts a predefined minimum duration. When a pre-selection is implemented, the corresponding interaction element may be highlighted in the virtual image 200 to provide optical feedback to the user.

In addition to selecting and activating or executing functions associated with interaction elements, the user may issue a command to rotate the 3D object 202 in order to access interaction elements on a different region on a different face of the object. In FIG. 2A, the first region 212 of the 3D object 202 faces the user. To rotate the cube 202, the user touches a corner of the cube 202 in the virtual 3D image 200 using, for example, a finger. The position of the user's finger is detected using the stereoscopic camera 131 and the evaluation unit 135 of the input unit 130 (FIG. 1).

FIG. 2B shows an example of how the user may rotate the cube 202 in FIG. 2A. With the user's finger 150 on a first corner 220 of the cube 202, the user may perform a gesture by moving the finger 150 in the direction in which the 3D object 202 is to be rotated. This movement is indicated by an arrow A in FIG. 2B. The gesture is recognized by the input unit 130 by tracking the location and/or shape of the finger 150, and is interpreted as a command to rotate the 3D object 202 in the corresponding direction. The command is then communicated to the display control unit 120 (in FIG. 1), which issues corresponding commands to the 3D display unit 101 (in FIG. 1). The 3D display unit 101 controls the display device 102 to generate the corresponding virtual image showing the 3D object 202 rotated. The virtual image is generated by displaying the different views for binocular perception by the user 140 as the virtual image 200.

FIG. 2C illustrates the result of the rotation of the cube 202. The 3D object 202 is shown oriented with the face having the second region 214 now facing the user. In example implementations, the interaction elements located in the region facing the user are selectable while the interaction elements in other regions are disabled in order to prevent an accidental activation. In other example implementation, the interaction elements of all regions may be active.

The vehicle user interface unit 100 may generally be operated by the driver of the vehicle or a passenger. In a vehicle, the general locations of driver and passengers are usually known. The virtual image 200 may be generated at different spatial positions to allow users observing the virtual image 200 along different angles from the different driver and passenger positions in the vehicle. The vehicle user interface unit 100 may be provided with a way of determining which user is trying to input a command at any given time in order to correctly determine the position of the virtual image 200 seen by the respective user. Sensors may be provided in the vehicle for determining the vehicle occupancy. Information obtained from these sensors may be used to identify the user that is trying to input a command. In a vehicle, the positions of the driver or the other passengers are generally predefined by the corresponding seat positions. The position of the virtual image 200 may be suitably determined based on the predefined positions without information from additional sources.

The determination of the position of the virtual image 200 may be enhanced by determining the position of the head of the user 140. The position of the user's head may be determined from the images acquired by the stereoscopic camera 131 (in FIG. 1), or by providing one or more additional cameras 132, which may be non-stereoscopic cameras. The camera 132 may be arranged inside the vehicle cabin at a location that allows the camera 132 to monitor the passenger's head. A camera for monitoring the passenger's head position may already be provided inside the vehicle, as part of a safety system for example. Information obtained from such a camera may be used by the evaluation unit 135.

The evaluation unit 135 may perform a head tracking or a face tracking of the user's head in order to determine its position. Based on the head position, the evaluation unit 135 may determine the angle along which the user observes the display 102. This information and the information on the 3D image 200 generated by the display control unit 120 may be used by the evaluation unit 135 to more precisely determine the spatial position at which the user 140 observes the virtual 3D image 200. The spatial location of the interaction elements on the 3D object 202 may then be determined to make user activation of the interaction elements using the user-controlled object (in this example, the user's finger) more robust and accurate.

Referring to FIG. 1, the vehicle user interface unit 100 may be configured to provide acoustic feedback to the user 140 when the user-controlled object 150 is within a predetermined distance of an element of the 3D object 111 in the virtual 3D image 110. The acoustic feedback may reduce the attention required of the user 140 on the display 102 while operating the vehicle user interface 100. Example implementations may use a variety of techniques for providing user feedback including using different sounds being output for different events. For example, a first audio signal may be provided when the finger of the user approaches the 3D object 111, which may be generated using a frequency that changes according to the distance from the 3D object 111. A second sound may be provided when the finger of the user virtually touches an interaction element. A third sound may be provided when the finger of the user reaches a corner or an edge of a face of the 3D object 111. Additional acoustic signals may be provided for pre-selection, activation or execution of an interaction element, or for rotating the 3D object 111. The added acoustic feedback and variations in generating sounds with meanings understood to the user may substantially reduce the attention to the 3D object 111 required of the user to operate the vehicle user interface unit 100. The acoustic feedback signals may be generated by the evaluation unit 135 and played out using an amplifier and a loudspeaker, neither of which is illustrated in the figures.

As described above with reference to FIGS. 1, and 2A-2C, the vehicle user interface unit 100 provides a virtual, three-dimensional graphical user interface on which a plurality of interaction elements such as menu items or information elements may be clearly arranged and easily accessed. Each face of the 3D object may also display a part of a menu structure, such as for example, a menu or a submenu, to allow the user to access a menu item of a submenu without the need to browse through hierarchically higher menus.

It is to be understood by those of ordinary skill in the art that the vehicle user interface unit 100 may include other components, such as mechanical control elements for user interaction, further display components and similar components. The functional units shown in FIG. 1 may be implemented in a variety of ways. The evaluation unit 135 may be implemented by using a microprocessor, which may include the same microprocessor that performs functions for the display control unit 120 as described above. Or, in other implementations, a separate microprocessor may be used. The display control unit 120 and the evaluation unit 135 may be implemented as software functions running on a microprocessor.

The microprocessor may be the microprocessor of the vehicle electronic device that uses the user interface unit 100 for user interaction. The vehicle electronic device may be a head unit that controls vehicular functions and other electronic devices, which may include a multimedia or a navigation system. The vehicle electronic device may also be a less complex system, such as a car stereo. The vehicle user interface unit 100 may also be provided as a component that is separate from the vehicle electronic device. For example, the vehicle user interface unit 100 may be implemented inside a headrest and communicate with the vehicle electronic device using wired or wireless communication interface. By providing the vehicle user interface unit 100 in the headrest, a passenger in the rear passenger compartment of a vehicle may make use of the vehicle user interface unit 100. Multiple vehicle user interface units 100 may also be provided in the vehicle compartment.

Figure 3:
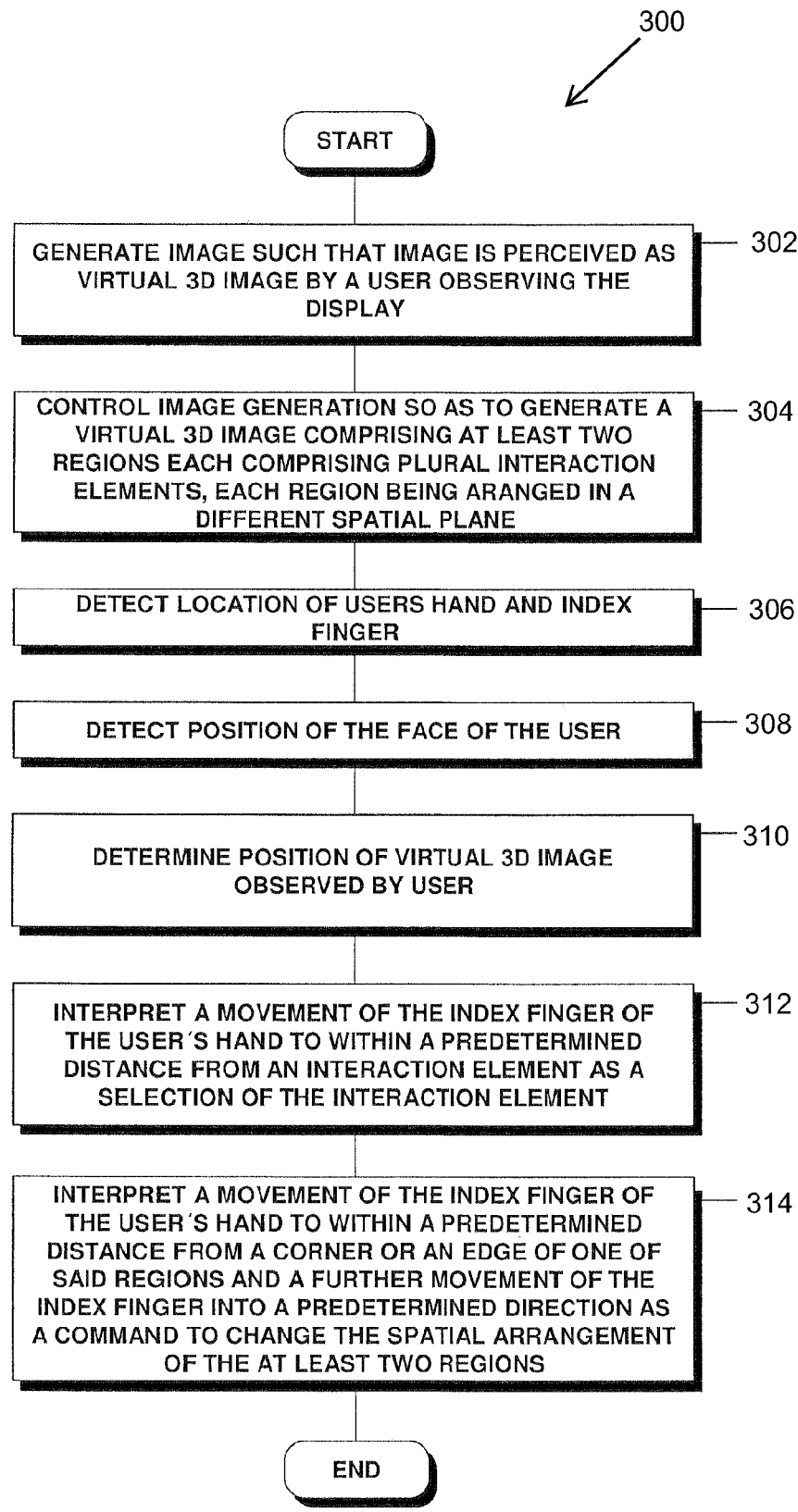
FIG. 3 is a flow chart illustrating operation of an example of a method for operating a vehicle user interface unit.

FIG. 3 is a flow chart illustrating operation of an example of a method 300 for operating a vehicle user interface unit. The vehicle user interface unit 100 of FIG. 1 may be configured to perform the method described with reference to FIG. 3. In the method 300 shown in FIG. 3, an image is generated for perception by the user as a virtual 3D image in step 302. The virtual 3D image may be generated using the 3D display unit 101 in FIG. 1, for example. In step 304, the image is generated as a virtual 3D image having at least two regions (regions 112 and 113 on the faces of the cube in FIG. 1, for example) each having a plurality of interaction elements. Each region is arranged in a different spatial plane, which multiplies the amount of that can be presented to the user. In step 306, the location of the user's hand and index finger is detected using, for example, the input unit 130 in FIG. 1.

In step 310, the position in space at which the user observes the virtual 3D image may be determined by making use of an additional camera to track the user's face. The position at which the user observes the virtual 3D image provides a more precise determination of the viewing angle along which the user observes the display. In addition, the relative positions of the tip of the index finger of the user's hand and the elements provided in the virtual image may be determined with more precision.

In step 312, the motion of the tip of the user's finger to within a predetermined distance from an interaction element arranged on the 3D object may be detected, and interpreted as a selection of the corresponding interaction element. The function associated with the interaction element may then be executed. Examples of such functions include the adjustment of a parameter such as a volume setting or a temperature setting, the selection of a destination in a navigation application, the selection and playback of a media file, the initiation of a communication via a mobile telephony network or a car-to-car communication system, or any other desired function.

The user may access an interaction element located on a different face of the 3D object using his finger to initiate a command to change the spatial arrangement of the at least two regions having the interaction elements. In step 314, a command to change the spatial arrangement of the object may be performed in response to the movement of the index finger of the user's hand to within a predetermined distance from a corner or an edge of one of the regions followed by another movement of the index finger in a predetermined direction. As described above with reference to FIGS. 2A-C, the user may for example place a finger on the corner of the cube and drag it in one direction resulting in the rotation of the cube. The user may perform the rotation of the cube so that the desired interaction element is facing the user. The interaction elements of particular submenus on other faces may be in view of the user via the partial transparency of the faces and easily accessed by the simple gesture used to rotate the cube. The gesture described with reference to step 314 precludes the need for the user to browse through a plurality of menu levels in the hierarchy of menus to find the desired function.

The examples of implementations described above may be modified in a variety of ways without departing from the scope of the invention. For example, the display control unit 120 in FIG. 1 may be configured as another type of polyhedron or a sphere, with spherical caps forming the regions in which the interaction elements are placed. Some regions may include interaction elements in the form of information elements, which may for example display the current status of vehicle electronic systems or other vehicle systems, navigation information or other information. Other regions may include interaction elements in the form of menu items for executing functions, entering further submenus, adjusting parameters, and performing other functions. Both types of interaction elements may also be combined on a region. As noted above, the functional units of the vehicle user interface unit may be implemented in a variety of ways, such as for example, as common or separate integrated circuits, as software code running on a microprocessor or a combination of hardware and software components.

It is to be understood that in the above description of example implementations, the partitioning of the system into functional blocks or units as shown in the drawings is not to be construed as indicating that these units necessarily are implemented as physically separate units. Rather, functional blocks or units shown or described may be implemented as separate units, circuits, chips or circuit elements, and one or more functional blocks or units may also be implemented in a common circuit, chip, circuit element or unit.

It will be understood, and is appreciated by persons skilled in the art, that one or more processes, sub-processes, or process steps described in connection with FIGS. 1-3 may be performed by hardware and/or software. If the process is performed by software, the software may reside in software memory (not shown) in a suitable electronic processing component or system such as, one or more of the functional components or modules schematically depicted in FIG. 1. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A vehicle user interface unit for a vehicle electronic device, comprising:
   a three-dimensional ("3D") display unit having a display, the 3D display unit being configured to display an image perceivable by a user as a virtual 3D image at least partially located in front of the display when the user observes the display;
   a display control unit configured to control generation of the image by the 3D display unit where the virtual 3D image includes a 3D object, the 3D object having at least two regions located in different spatial planes, each region of the at least two regions having interaction elements;
   a detector configured to determine a position of a user's head and determine a location of the virtual 3D image based on the determined position of the user's head; and
   a camera input unit configured to:
      determine an angle along which the user perceives the display based on the determined position of the user's head and based on the determined location of the virtual 3D image;
      detect, from the determined perception of the user, a location of a finger of the user within a predetermined distance from at least one of the interaction elements;
      interpret as a selection of the at least one of the interaction elements, the detection of the location of the finger within the predetermined distance;
      provide an acoustical feedback to the user when the finger comes to within a predetermined distance of an element of the 3D object or when selection of one of the interaction elements is detected; and
      provide an audio signal as the acoustical feedback, the audio signal having a frequency that changes according to the location of the finger.

2. The vehicle user interface unit of claim 1, where the display control unit is configured to generate the image indicating an active region of the at least two regions in which the interaction elements are selectable and interaction elements of the at least one other region are not selectable, where the active region is a region of the at least two regions that is located closer to an observing user in the virtual 3D image than the at least one other region.

3. The vehicle user interface unit of claim 1, where the display control unit is configured to generate the image where the 3D object is a cube or a cuboid.

4. The vehicle user interface unit of claim 1, where the display control unit is configured to generate the image where the 3D object is oriented with a face facing the user, the face facing the user being an active region in which the interaction elements are selectable.

5. The vehicle user interface unit of claim 1, where the camera input unit is configured to detect a second predefined variation of the finger and to interpret the second predefined variation as a command to change a spatial arrangement of the at least two regions.

6. The vehicle user interface unit of claim 5, where the camera input unit is configured to detect positioning of the finger of the user at a boundary or a corner of one of the at least two regions and movement of the finger over a predetermined distance as the second predefined variation of the finger.

7. The vehicle user interface unit of claim 1, where the display control unit is configured to change a spatial arrangement of the at least two regions by rotating the 3D object to orient a different face of the 3D object having different interaction elements to face the user.

8. The vehicle user interface unit of claim 1, where the camera input unit includes a stereoscopic camera configured to monitor an area adjacent to a position at which the virtual 3D image is created for detecting the location and a variation of the finger.

9. The vehicle user interface unit of claim 1, further comprising:
   a camera for monitoring a viewpoint from which the user observes the display, where the user interface unit is configured to determine a position at which the virtual 3D image is seen by the user observing the display based on the viewpoint.

10. The vehicle user interface unit of claim 1, where the 3D display unit is an autostereoscopic 3D display unit.

11. The vehicle user interface unit of claim 1, where the 3D display unit is housed in a face plate of the vehicle electronic device.

12. A method of operating a vehicle user interface unit of a vehicle electronic device, the method comprising:
   generating, by a processor, a virtual three-dimensional ("3D") image at least partially located in front of a display of a 3D display unit used to generate the virtual 3D image;
   controlling, by the processor, the generation of the virtual 3D image to include a 3D object, the 3D object having at least two regions located in different spatial planes, each region of the at least two regions having interaction elements;
   determining, by the processor, a position of a user's head;
   determining, by the processor, a location of the virtual 3D image from a perception of the user based on the determined position of the user's head;
   determining, by the processor, an angle along which the user perceives the display based on the determined position of the user's head and based on the determined location of the virtual 3D image;
   detecting, by the processor, from the determined perception of the user, a location of a finger of the user and interpreting a detection of a predefined variation of the finger as a selection of one of the interaction elements in the virtual 3D image, where the predefined variation of the finger includes movement of the finger to within a predetermined distance of an interaction element in the virtual 3D image; and
   providing an acoustical feedback to the user when the finger comes to within a predetermined distance of an element of the 3D object or when a selection of one of the interaction elements is detected, the acoustical feedback including an audio signal having a frequency that changes according to the location of the finger.

13. A vehicle infotainment system comprising:
   an infotainment control system for performing infotainment functions; and
   a vehicle user interface unit for providing user access to control of the infotainment functions, the vehicle user interface unit having:
      a three-dimensional ("3D") display unit having a display, the 3D display unit being configured to display an image configured for perception by a user as a virtual 3D image at least partially located in front of the display when the user observes the display;
      a display control unit configured to control generation of the image by the 3D display unit where the virtual 3D image includes a 3D object, the 3D object having at least two regions located in different spatial planes, each region of the at least two regions having interaction elements;

a detector configured to determine a position of a user's head and determine a location of the virtual 3D image based on the determined position of the user's head; and a camera input unit configured to determine an angle along which the user perceives the display based on the determined position of the user's head and based on the determined location of the virtual 3D image, to detect, from the determined perception of the user, a location of a finger of the user within a predetermined distance from at least one of the interaction elements, to interpret a detection of a predefined variation of the finger from the determined perception of the user as a selection of one of the interaction elements in the virtual 3D image, and to provide an acoustical feedback to the user when the finger comes to within a predetermined distance of an element of the 3D object or when a selection of one of the interaction elements is detected, the acoustical feedback including an audio signal having a frequency that changes according to the location of the finger.

14. The vehicle infotainment system of claim 13, where the display control unit is configured to generate the image indicating an active region of the at least two regions in which the interaction elements are selectable and interaction elements of the at least one other region are not selectable, where the active region is a region of the at least two regions that is located closer to an observing user in the virtual 3D image than the at least one other region.

15. The vehicle infotainment system of claim 13, where the display control unit is configured to generate the image where the 3D object is a cube or a cuboid.

16. The vehicle infotainment system of claim 13, where the display control unit is configured to generate the image where the 3D object is oriented with a face facing the user, the face facing the user being an active region in which the interaction elements are selectable.

17. The vehicle infotainment system of claim 13, where the camera input unit includes a stereoscopic camera configured to monitor an area adjacent to a position at which the virtual 3D image is created for detecting the location and a variation of the finger.

18. A vehicle cabin comprising:
an electronic device having a vehicle user interface unit for providing user access to control of functions of the electronic device, the vehicle user interface unit having:
a three-dimensional ("3D") display unit having a display, the 3D display unit being configured to display an image configured for perception by a user as a virtual 3D image at least partially located in front of the display when the user observes the display;
a display control unit configured to control generation of the image by the 3D display unit where the virtual 3D image includes a 3D object, the 3D object having at least two regions located in different spatial planes, each region of the at least two regions having interaction elements;
a detector configured to determine a position of a user's head and determine a location of the virtual 3D image based on the determined position of the user's head; and
a camera input unit configured to determine an angle along which the user perceives the display based on the determined position of the user's head and based on the determined location of the virtual 3D image, to detect, from the determined perception of the user, a location of a finger of the user within a predetermined distance from at least one of the interaction elements, to interpret a detection of a predefined variation of the finger from the determined perception of the user as a selection of one of the interaction elements in the virtual 3D image, and to provide an acoustical feedback to the user when the finger comes to within a predetermined distance of an element of the 3D object or when a selection of one of the interaction elements is detected, the acoustical feedback including an audio signal having a frequency that changes according to the location of the finger.

19. The vehicle cabin of claim 18, where the predefined variation of the finger includes a movement of the finger to within a predetermined distance from at least one of the interaction elements, the camera input unit being further configured to interpret a detection of the movement as a selection of a corresponding interaction element.

20. The vehicle cabin of claim 18, where the display control unit is configured to generate the image indicating an active region of the at least two regions in which the interaction elements are selectable and interaction elements of the at least one other region are not selectable, where the active region is a region of the at least two regions located closer to an observing user in the virtual 3D image than the at least one other region.

21. The vehicle cabin of claim 18, where the display control unit is configured to generate the image where the 3D object is a cube or a cuboid.

22. The vehicle cabin of claim 18, where the display control unit is configured to generate the image where the 3D object is oriented with a face facing the user, the face facing the user being an active region in which the interaction elements are selectable.

23. The vehicle cabin of claim 18, where the camera input unit includes a stereoscopic camera configured to monitor an area adjacent to a position at which the virtual 3D image is created for detecting the location and a variation of the finger.

* * * * *